(No Model.)
A. KING.
HARNESS.
No. 338,980. Patented Mar. 30, 1886.
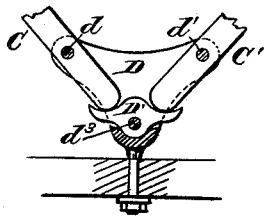
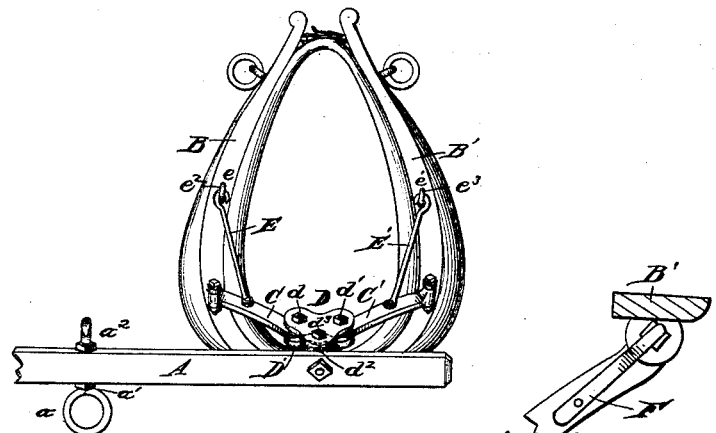
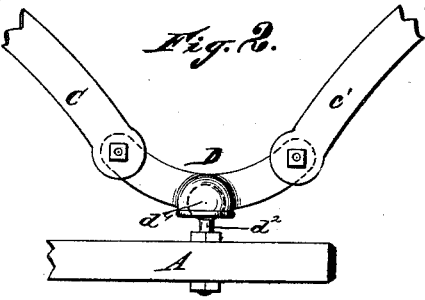
WITNESSES
Jno. E. Wiles,
N. S. Wright.
INVENTOR
Adam King,
By W. W. Jeggris.
Attorney

UNITED STATES PATENT OFFICE.

ADAM KING, OF COLBORNE, ONTARIO, CANADA.

HARNESS.

SPECIFICATION forming part of Letters Patent No. 338,980, dated March 30, 1886.

Application filed December 15, 1885. Serial No. 185,758. (No model.)

*To all whom it may concern:*

Be it known that I, ADAM KING, of Colborne, county of Northumberland, Province of Ontario, Canada, have invented a new and useful Improvement in Harnesses; and I declare the following to be a full, clear, and exact description of the invention, such as will enable others skilled in the art to which it pertains to make and use it, reference being had to the accompanying drawings, which form a part of this specification.

My invention relates to improvements in harnesses, and is especially designed to dispense with traces and whiffletrees.

For many uses—as, for instance, in plowing in young orchards—it is very desirable to dispense with whiffletrees, as they are very liable to impair and injure the trees, and it is almost impossible to plow among them with an ordinary harness without occasioning more or less injury of this kind.

My invention, therefore, consists of the combination of devices and appliances, as more particularly hereinafter described, and pointed out in the claims.

In the drawings, Figure 1 represents a front view illustrating my invention. Fig. 2 is a modification. Fig. 3 is a side view partly in section, with parts broken away, illustrating on an enlarged scale the clevis and other parts.

I carry out my invention as follows: A represents a draft-bar, which may be provided with a ring, $a$, having its staple $a'$ passed through the bar and preferably provided with a hook, $a^2$, at the top for engaging with a chain, which may be extended back to the plow-beam.

B B' represent ordinary hames.

C C' represent metallic bars, secured at each of their respective ends to the adjacent hame, and at its opposite end pivoted to a clevis, D, as shown at $d$ $d'$. This clevis is provided with a stem, $d^2$, engaged in one end of the draft-bar, so as to be rotatable therein. The clevis is also provided with a movable lip, D', pivoted therein intermediate of its ends at $d^3$.

It is evident that in the motion of the horse there will be more or less vibration communicated to the bars C C', and this vibratory lip will permit said bars to yield against the end of said lip, the lip serving as an equalizer against the ends of said bar.

The operation of the device is as follows: The horse is provided with an ordinary collar and the hames simply, to which are attached the bars C C'. The horse presses against the collar in the ordinary way and communicates the pressure through the bars C C' forward to the draft-bar, dispensing with the back-strap and traces of the harness and requiring no whiffletrees. The bars C C' are rounded sufficiently to reach about the breast of the horse, and enabling the strain to come equally upon each of the hames. I prefer also to unite each of said bars with the hames by an additional brace-rod, E E', said rods rigidly engaged at their forward ends upon the bars C C', and preferably constructed with an upturned hooked end, as shown at $e$ $e'$, which may be rigidly engaged in suitable loops upon the respective hames, as shown at $e^2$ $e^3$. These bars are engaged with the hames at an angle, so as to occasion a more even pressure.

I do not limit myself to the particular construction of the clevis shown in Fig. 1 and already herein described; as any suitable clevis or device may be employed in this location to engage the forward ends of the bars C C'. All that is desirable is that said bars may have a pivotal connection with said clevis, and that the clevis may also have freedom to oscillate to some extent vertically as well as horizontally in its engagement with the bars C C'. This vertical oscillation will be desirable for horses of uneven heights. Accordingly, in Fig. 2 I have shown a variation, in which the stem $d^2$ is engaged with the clevis by means of a ball-and-socket joint, as shown at $d^4$, in which case the stem need not have a rotatable engagement in the draft-bar. This device is not only capable of employment with a plow, but I would have it understood that it may be employed wherever desired, and it may be equally well employed in engaging a team to a wagon, the pole of the wagon being firmly engaged with the neck-yoke, in which case, however, it might be desirable to add to the harness the ordinary holdback-straps of any suitable variety. The bars C C' may be engaged with the hames at their forward ends by means of ordinary bolts and nuts; but for convenience of forming the engagement the nuts may be dispensed with and the bars provided with springs F, Fig. 2, bearing upon the ends of the bolts to keep them in place.

What I claim is—

1. In a harness, the combination, with a draft-bar and hames, of a clevis attached to said draft-bar and the hinged or pivoted inclined metallic bars C C', attached to the hames and having a pivotal connection with said clevis, substantially as described.

2. In a harness, the combination of the draft-bar A, the hames B B', the clevis D, secured to the draft-bar, the inclined bars C C', connecting the clevis and hames, and the braces E E', connecting the hames and bars C C', substantially as described.

In testimony whereof I sign this specification in the presence of two witnesses.

ADAM KING.

Witnesses:
 N. S. WRIGHT,
 M. B. O'DOGHERTY.